(12) United States Patent
Mungall et al.

(10) Patent No.: US 7,025,533 B1
(45) Date of Patent: Apr. 11, 2006

(54) CONCENTRATED BUOYANCY SUBSEA PIPELINE APPARATUS AND METHOD

(75) Inventors: John Christian Hartley Mungall, Houston, TX (US); Khamir Girish Joshi, Sugar Land, TX (US); Craig Wonder Lamison, Houston, TX (US)

(73) Assignee: Kellogg Brown & Root, Inc., Houston, TX (US)

( * ) Notice: Subject to any disclaimer, the term of this patent is extended or adjusted under 35 U.S.C. 154(b) by 0 days.

(21) Appl. No.: 10/711,489

(22) Filed: Sep. 21, 2004

(51) Int. Cl.
*F16L 1/12* (2006.01)

(52) U.S. Cl. .................... 405/158; 405/162; 405/171; 405/184.4

(58) Field of Classification Search ............... 405/158, 405/168.1, 162, 169, 171–173, 224.2, 170, 405/184.4; 114/293, 294; 441/3–5; 166/350, 166/359, 367
See application file for complete search history.

(56) References Cited

U.S. PATENT DOCUMENTS

| | | | |
|---|---|---|---|
| 3,111,926 A * | 11/1963 | Shatto, Jr. ................. | 114/293 |
| 3,173,271 A * | 3/1965 | Wittgenstein ............... | 405/172 |
| 3,835,656 A * | 9/1974 | McDermott ................. | 405/170 |
| 4,274,757 A * | 6/1981 | Francisco-Arnold ......... | 405/161 |
| 4,906,137 A * | 3/1990 | Maloberti et al. ........ | 405/224.3 |
| 4,909,670 A * | 3/1990 | Harrison ................... | 405/168.2 |
| 5,275,510 A * | 1/1994 | de Baan et al. ............ | 405/171 |
| 5,615,977 A | 4/1997 | Moses et al. ............ | 405/195.1 |
| 6,062,769 A * | 5/2000 | Cunningham ............ | 405/195.1 |
| 6,109,833 A * | 8/2000 | Savy ....................... | 405/195.1 |
| 6,595,725 B1 * | 7/2003 | Shotbolt .................. | 405/224.2 |
| 6,763,862 B1 * | 7/2004 | Fontenot et al. .............. | 441/3 |
| 6,811,355 B1 * | 11/2004 | Poldervaart ................ | 405/169 |
| 6,910,831 B1 * | 6/2005 | Raines .................... | 405/224.1 |
| 2005/0158126 A1 * | 7/2005 | Luppi ...................... | 405/224.2 |

FOREIGN PATENT DOCUMENTS

| | | | |
|---|---|---|---|
| GB | 2273087 | * | 6/1994 |
| WO | 2004068014 | * | 8/2005 |

OTHER PUBLICATIONS

Walid Soliman, et al., "Offshore Technology Challenges—The Sigsbee Escarpment," KBR Offshore, Issue 7, Jun. 2003, Houston, TX.
Gunnar Paulsen, et al., "Submerged Floating Pipeline in Deep Water," International Offshore & Polar Engineering Conference, May 28, 2000, Seattle WA.

* cited by examiner

Primary Examiner—Jong-Suk (James) Lee
(74) Attorney, Agent, or Firm—Lundeen & Dickenson, LLP; Bradley A. Misley

(57) ABSTRACT

Various apparatuses and methods to traverse an undersea topographic feature (12) with a subsea pipeline (18) are disclosed. The apparatuses and methods of the present invention accomplish this task through the use of a concentrated buoyancy scheme (10). The invention disclosed can allow more efficient and cost effective traversal of hostile terrain for subsea pipelines at great depths while minimizing the risk of rupturing the pipeline (18) or negatively impacting the surrounding undersea environment.

32 Claims, 12 Drawing Sheets

CONCENTRATED BUOYANCY SUBSEA PIPELINE APPARATUS AND METHOD

BACKGROUND OF THE INVENTION

The pursuit of petroleum products in deep waters has revealed an underwater world completely different from a level or gradually sloping seabed. Far off the coast, unlike relatively featureless continental shelves where most offshore oil and gas has been historically developed, the deep-water ocean bottom has hazardous topographic features that can compromise pipelines and subsea structures. These topographic features include enormous basins, domes, valleys, cliffs, canyons, and escarpments.

An escarpment, or scarp, is a steep slope or cliff formed by erosion or faulting. The Sigsbee Escarpment, for example, is the largest in the Gulf of Mexico and lies beyond the edge of the continental shelf thousands of feet below the sea surface. The Sigsbee Escarpment encompasses drops of hundreds to over a thousand feet and extends for hundreds of miles. Between the Sigsbee Escarpment and the continental shelf exists a region called the continental slope. Because of the randomness and variability of the salt and sediment deposits, the topography of the continental slope is a complex landscape with many scarp-like features.

This complex topography is a significant challenge to laying subsea pipelines across these regions. The abrupt changes in the slope across such topographic features and escarpments can cause pipelines crossing them to bend sharply. This bending leads to ovalization of the pipeline cross section which may cause the pipeline to buckle and collapse. Long free spans exceeding the stress and vortex induced vibration fatigue limits of the pipeline can also result from seabed irregularities associated with these topographic features.

Subsea pipelines are most often used to transport production fluids from offshore facilities to land or to other offshore facilities. Such fluids include, but are not limited to, gases (methane, ethane, etc.) liquid hydrocarbons, additives (diluents added to heavy fluids or corrosion control additives), or any mixture thereof. Many issues arise with respect to the laying of subsea pipelines including countering the subsea currents, traversing the varying topography, and the complexity of the installation process itself. Existing solutions for spanning the treacherous topographic features described above can be too costly, risky, environmentally destructive, or result in other hazards.

Existing solutions include re-routing pipelines through existing valleys or canyons where the slope is more gradual, drilling subsea conduits, and blasting or trenching the undersea topography to provide a better support profile for the pipeline. The re-routing option can be time consuming and expensive because it requires a longer pipeline. The trenching, blasting and drilling options can have a negative impact on the undersea environment and sea life and can likewise be very costly. Other options, including the installation of rigid pilings and framework to support pipeline spans have been tried on smaller scale installations, but would be very costly on longer spans.

Undersea pipelines are crucial to the low cost delivery of production fluids (hydrocarbons) from offshore facilities to land or to other offshore facilities. If pipelines are not available, the hydrocarbons must be transported via tankers or some other means to the coast. Pipelines are generally considered lower risk than tankers because there is significantly less risk of maritime collisions and there are fewer exchanges (platform to tanker; tanker to shore facility) of the hydrocarbons. The hazardous topography of the continental slopes increases the risk (through stresses and failures) that leaks may occur. A solution that safely allows pipelines to traverse hazardous topography in a manner that is cost effective and environmentally responsible would be highly desirable.

BRIEF SUMMARY OF THE INVENTION

The deficiencies of the prior art are addressed by methods and apparatuses to elevate a subsea pipeline section using concentrated buoyancy to facilitate the traversal of steep underwater slopes, hazardous topographic features, and other varied irregularities on the seabed.

One embodiment of the invention is an apparatus that includes a subsea pipeline to carry fluids from a first to a second location and at least one concentrated buoyancy device. The pipeline extends from a first section, to the concentrated buoyancy device, and then to the second section with the buoyancy device providing a connection between the first and second pipeline sections. The concentrated buoyancy device can be one or more devices, either cylindrical, rectangular, profiled, H-shaped, or other configuration and/or can be an integrated buoyancy device. Optionally, a mooring system to secure the concentrated buoyancy device in a particular location can be employed. If employed, the mooring system can include one or more pilings (either suction, driving, or any other type of piling known to those skilled in the art) and one or more mooring lines connecting the pilings to the concentrated buoyancy device. The mooring system can exist either proximate to the first section of pipeline, the second section of pipeline, or midway between both sections of pipeline. Optionally, a flexure control device including, but not limited to a stress joint, a flex joint, a swivel, or an anchor can be employed either at the first or second sections of pipeline to prevent pipeline from over stressing or otherwise being damaged. If present, the flexure control device can be offset from a cliff edge of the topographic feature, depending on if a more favored formation is present elsewhere.

One method for traversing an undersea topographic feature with a subsea pipeline includes installing a plurality of pilings (either suction, driven, or any other type known to those skilled in the art) on the sea floor where a concentrated buoyancy device is desired. Using mooring lines attached between the pilings and the buoyancy device, the buoyancy device is winched down to its desired location where first and second sections of pipeline are subsequently attached thereto. Installing a jumper section, to span the buoyancy device and connect first and second pipelines, completes the traversal. Optionally, remotely operated vehicles and surface towing vessels can be used to stabilize the buoyancy device and pipeline sections during the installation process.

A second method for traversing an undersea topographic feature with a subsea pipeline includes connecting a first buoyancy device to a first section of pipeline and a second buoyancy device to a second section of pipeline. The first section of pipeline (with attached first buoyancy device) is then laid before the topographic feature, and the second section of pipeline (with attached second buoyancy device) is laid after the topographic feature. The buoyancy devices can then be winched together to create a single unified buoyancy device and a jumper connected across the buoyancy device to connect the first and second sections of pipeline. Optionally, remotely operated vehicles may assist in connecting the jumper line from the first section of pipeline to the second section of pipeline. Also, fluids may be added (or taken away) during the winching process of the two buoyancy devices to allow buoyancy devices to sink into a desirable position as they are winched together.

Finally, an assembly to connect a first pipeline segment to a second pipeline segment according to the second method summarized above can include a pair of buoyancy devices, each with a latching mechanism, a pulley mechanism, and a hinged basked. The hinged baskets are configured to receive and retain the pipeline segments in a hinged arrangement, one that allows the pipeline segments to swivel when so received. The pulley mechanism assists the winching process by allowing tension cable to be routed from a first winch, to the first buoyancy device, to the second buoyancy device, and on to a second winch. As the tension cable is pulled by the two winches, the two buoyancy devices are winched together. The latching mechanism is configured to latch the pair of buoyancy devices together permanently (or at least semi-permanently) when the winching process is complete. Finally, the pair of buoyancy devices is configured to receive a jumper line to connect the first and second segments of pipeline together.

BRIEF DESCRIPTION OF THE DRAWINGS

For a more detailed description of the embodiments of the present invention, reference will be made to the accompanying drawings briefly described below.

DETAILED DESCRIPTION OF THE EMBODIMENTS

Figure 1A:
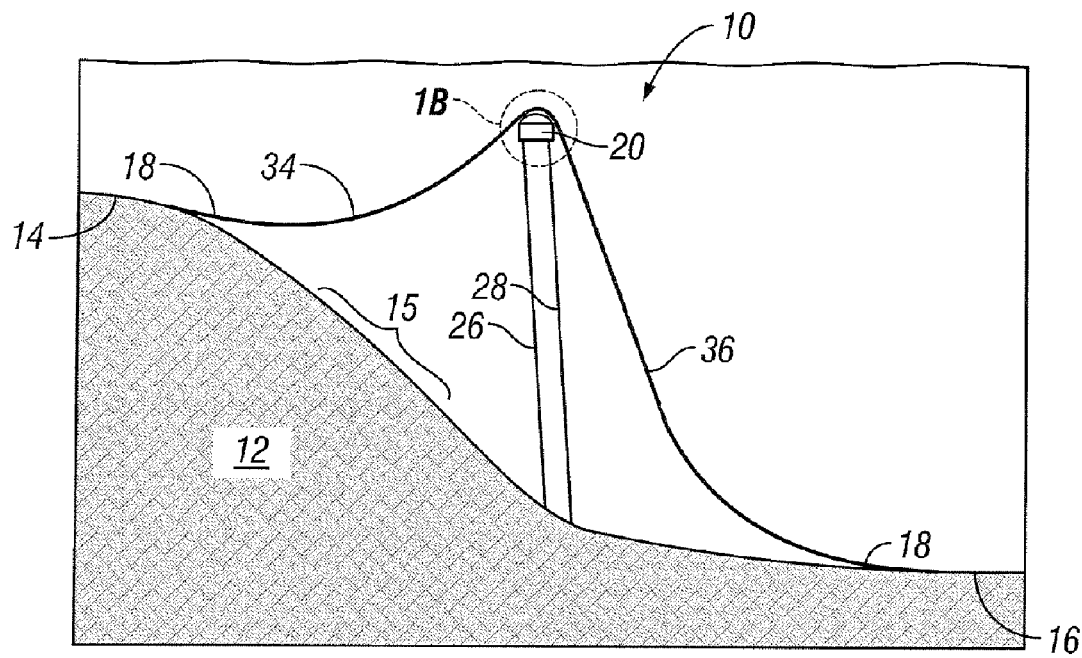
FIG. 1A is a schematic representation of a concentrated buoyancy pipeline system in accordance with the present invention.
Figure 1B:
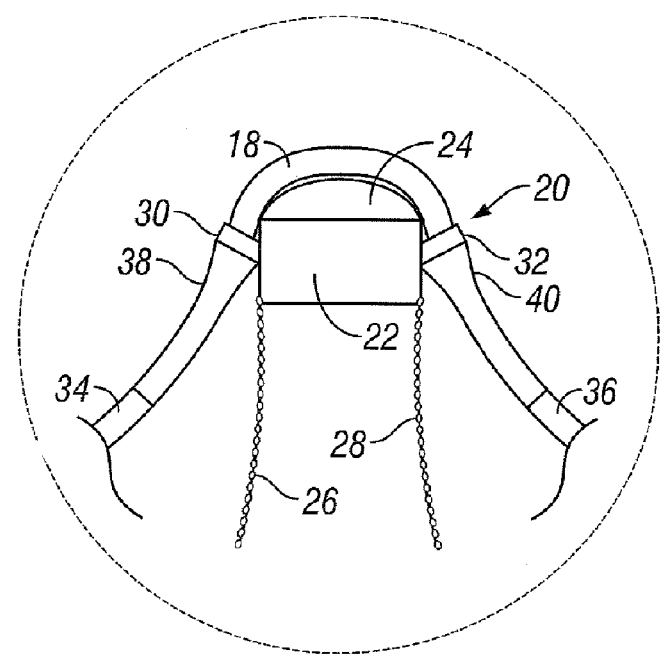
FIG. 1B is a close up representation of a buoyancy device of the concentrated buoyancy pipeline system of FIG. 1A.

Referring initially to FIGS. 1A and 1B together, a schematic of a concentrated buoyancy pipeline system 10 is shown. System 10 is shown traversing an undersea scarp 12 and extends from the top 14 of scarp 12, across a slope 15, to a bottom 16 of scarp 12. System 10 includes a length of pipeline 18 in a bell-shaped configuration as it traverses scarp 12. While a scarp 12 is shown, it should be understood to one of ordinary skill in the art that various other topographic obstructions and hazards including, but not limited to, basins, domes, valleys, cliffs, and canyons, may be traversed without departing from the spirit of the invention.

To traverse scarp 12, a concentrated buoyancy assembly 20 is located approximately mid-span along pipeline 18 to make it positively buoyant. Buoyancy assembly 20 desirably includes a buoyancy device 22, a profiled surface 24, and one or more tethers or mooring lines 26, 28 to secure concentrated buoyancy assembly 20 in place. Optionally, pipeline connectors 30, 32 can be used to help maintain pipeline 18 upon concentrated buoyancy assembly 20. Optionally, flex or stress joints 38, 40 may be used to control the stress on pipeline sections 34 and 36. Pipeline 18 includes section 34 extending from top 14 of scarp 12 to buoyancy assembly 20 in a catenary-like suspension. At buoyancy assembly 20, pipeline 18 can curve around buoyancy device 22 at profiled surface 24 and continue via second section 36 in a catenary-like suspension to bottom 16 of scarp 12. Optionally, connectors 30, 32, retain pipeline 18 on concentrated buoyancy assembly 20 and prevent slippage therefrom.

Referring generally to FIGS. 2A–2J, several concentrated buoyancy systems in accordance with the present invention are shown. FIGS. 2A–2J are merely schematic in nature and are solely for the purpose of detailing particular configurations available to one practicing the present invention. No specific material or component requirements are to be inferred from viewing these schematics. Furthermore, the reader is not to assume that FIGS. 2A–2J are drawn to any particular or consistent scale. FIGS. 2A–2J are merely to show various configurations and embodiments that are possible and are not drawn to reflect relative stress conditions of the pipeline systems disclosed therein. While various alternatives are shown for buoyancy devices, it should be understood that one of ordinary skill in the art could use such devices interchangeably. For example, buoyancy devices shown in FIGS. 2A–2J are shown as cylindrical (FIG. 2B), rectangular or profiled (FIG. 2A), or integral (FIG. 2D) to the lower portion of pipeline 18. In any pipeline installation, the selection of the buoyancy device to be used will depend on the conditions of the installation location and the budgetary concerns of the operating company among other factors. Furthermore, it should be understood by one of ordinary skill that additional tethers (not shown) can be secured to the pipeline and/or buoyancy device to further stabilize the various embodiments of undersea pipelines shown in FIGS. 2A–2J. These tethers, while not deployed as primary structural support for pipeline installations, offer secondary support in resisting the displacement of pipelines 18 that may result from undersea currents or installation conditions. These tethers, if used, are installed and secured using methods and apparatuses well known to one skilled in the art.

Referring generally now to FIGS. 2A–2D several embodiments for concentrated buoyancy pipeline suspension systems are shown. The schemes detailed in FIGS. 2A–2D are optionally deployed in situations where a bending control device with an anchor device (54, 64, 74, 84) is able to be optionally located in the immediate vicinity of the top 14 of scarp 12 and this type of installation is feasible where the formation at top 14 of scarp is sufficiently stable to allow such a bending control and/or anchor device to be permanently mounted. For those circumstances where the formation at top 14 of scarp 12 is not known to be sufficiently stable enough to support such a device, schemes detailed in FIGS. 2E–2J may instead be used. The schemes of FIGS. 2E–2J all allow the anchor and/or bending control devices to be located away from a cliff edge 14A at the top 14 of scarp 12.

Figure 2A:
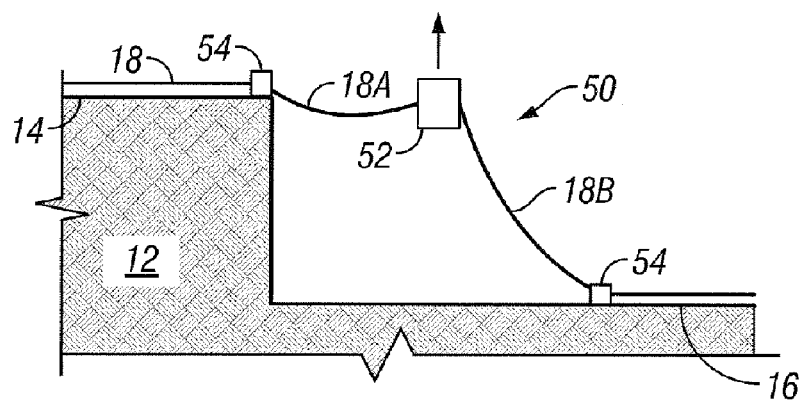
FIGS. 2A–2J are schematic representations of pipeline spans crossing a topographic feature and having a concentrated buoyancy system in accordance with embodiments of the present invention.

Referring specifically to FIG. 2A, a general schematic for one embodiment of a concentrated buoyancy pipeline system 50 is shown. Buoyancy system 50 includes pipeline 18 extending from top 14 to bottom 16 of scarp 12 through a buoyancy assembly 52. System 50 includes a flexure control device 54 at top 14 of scarp 12. Flexure control device 54 may be a flex joint or a tapered stress control joint or any other known to those skilled in the art. Primarily, flexure control devices 54 act either to allow the stress-free bending of pipeline 18 or to reduce the amount of stress experienced by the pipeline 18. Furthermore, flexure control device 54 acts as an anchor to resist displacement of pipeline 18 resulting from currents and other forms of loading. By adding flexure control device 54, the likelihood of ovalization of pipeline 18 adjacent thereto is greatly diminished.

Buoyancy device 52 is shown in FIG. 2A as an untethered device but may be tethered if the installation so requires. Using this system, the weight of lower section 18B of pipeline 18 can retain buoyancy device 52 in position. In this configuration, upper section 18A of pipeline 18 is designed to form a catenary with suitable curvature distribution between flexure control device 54 and buoyancy device 52. Lower section 18B of pipeline 18 may either exist in a catenary-shaped position with its lower end tangential to the seabed (as shown schematically) or may depart from the seabed at an angle greater than zero through the addition of another anchor flexure control device 54 at bottom 16 of scarp 12. This condition is referred to as taut and is shown by straight lines in the schematics.

Figure 2B:
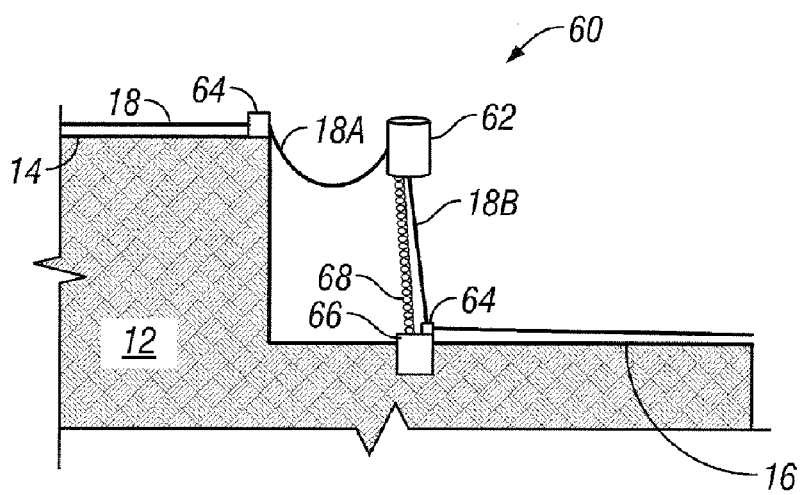

Referring now to FIG. 2B, an alternative embodiment for a concentrated buoyancy system 60 is shown. Pipeline buoyancy system 60 enables a pipeline 18 to extend from a flexure control device 64 at the top 14 of a scarp 12 to the bottom 16 of scarp 12. Buoyancy system 60 includes a buoyancy device 62 tethered to a piling 66 by a tether cable 68. Piling 66 may be constructed in any manner known to one skilled in the art, including, but not limited to, driven pilings, suction pilings, or other subsea anchors. Regardless of configuration, the purpose of piling 66 is to maintain a mounting fixed on the seabed to which buoyancy device 62 may be tethered to by tether cable 68. In this embodiment, pipeline section 18A extends from a flexure control device 64 to buoyancy device 62 in a catenary-like configuration. Pipeline section 18B then extends from buoyancy device 62 down to scarp bottom 16 under tension roughly parallel with tether cable 68. From scarp bottom 16, pipeline 18 is able to continue on the subsea floor to its next destination. Particularly, buoyancy device 62 may contain features that ease the transition from catenary section 18A to taut section 18B through an angle of about 90 degrees at buoyancy device 62. For example, pipeline sections 18A, 18B may terminate at buoyancy device 62 with a flexible, or rigid bent jumper (not shown) making the connection therebetween. Buoyancy device 62 of FIG. 2B is shown as a cylindrical buoy, but other designs known by one skilled in the art may be employed.

Figure 2C:
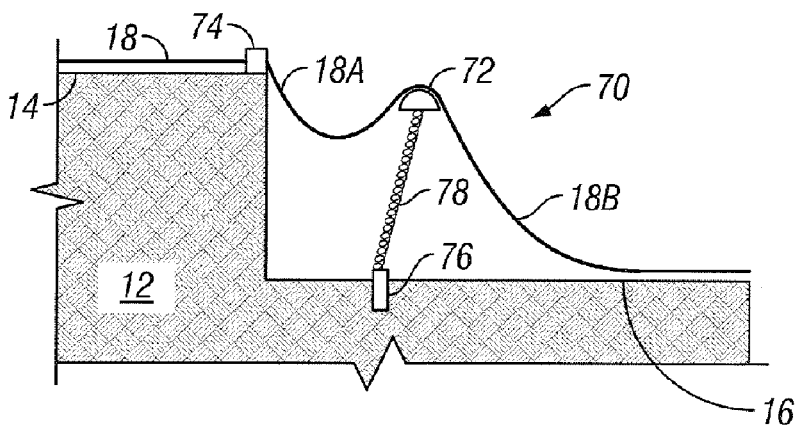

Referring now to FIG. 2C, a second alternative embodiment of a concentrated buoyancy pipeline system 70 is shown. Pipeline system 70 includes a buoyancy device 72 tethered to piling 76 by tether cable 78. Buoyancy system 70 enables pipeline 18 to traverse from a flexure control device 74 at top 14 of scarp 12 to buoyancy device 72 and then to bottom 16 of scarp 12. Two suspended sections 18A, 18B of pipeline 18 are thus created, each of which is suspended in a catenary-like shape. Buoyancy device 72 is shown as a profiled buoy, one that allows pipeline 18 to curve easily and smoothly thereacross with minimal or no ovalization experienced by the cross-section of pipeline 18. Alternatively, buoyancy device 72 may be constructed as an H-shaped, rectangular, or otherwise contoured buoyancy device, as would be appreciated by one of ordinary skill in the art.

Figure 2D:
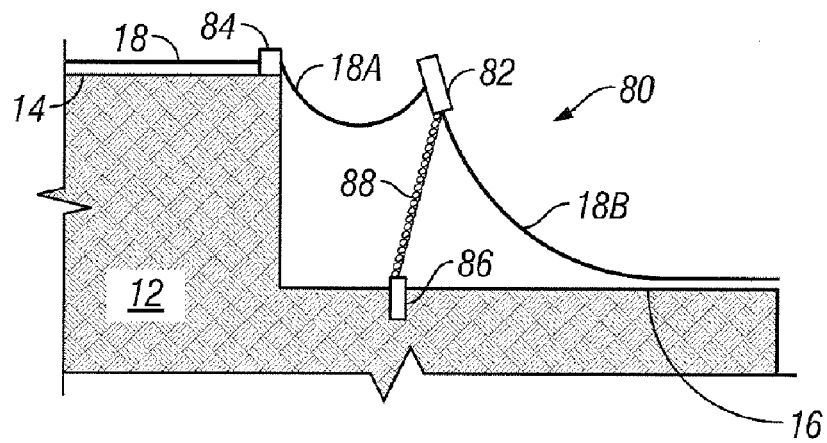

Referring now to FIG. 2D, a third alternative embodiment of a concentrated buoyancy pipeline system 80 is shown. Pipeline system 80 includes an integral buoyancy device 82 tethered to a piling 86 by a tether cable 88. Buoyancy system 80 allows pipeline 18 to traverse from flexure control device 84 at top 14 of scarp 12 to buoyancy device 82 and then to bottom 16 of scarp 12. As noted above, buoyancy device 82 is shown as an integral buoyancy device and is optionally integrated with bottom section 18B of pipeline 18. As a result, buoyancy device 82 is more rigidly connected to pipeline section 18B than to first section 18A, which is subsequently connected to buoyancy device 82 to complete the span. Pipeline sections 18A, 18B assume catenary-like geometries through their spans. Pipeline section 18B may assume a more gradual curve than span 18A due to buoyancy device 82 and pipeline section 18B being rigidly connected and towed out as a single unit.

Figure 2E:
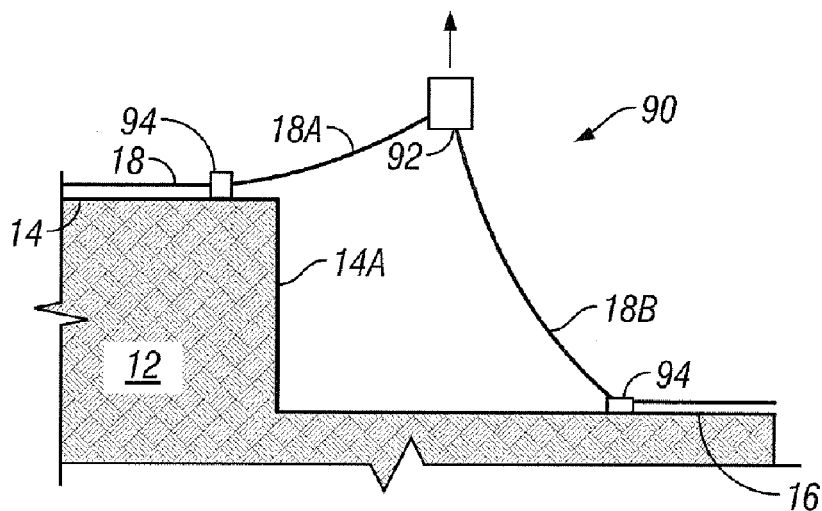

Referring generally now to FIG. 2E, a general schematic for a concentrated buoyancy pipeline system 90 is shown. Buoyancy system 90 includes pipeline 18 extending from top 14 to bottom 16 of scarp 12 through a buoyancy assembly 92. System 90 includes a flexure control device 94 located away from the cliff edge 14A at top 14 of scarp 12. In this embodiment, the location of flexure control device 94 is farther back on top 14 of scarp 12, away from cliff edge 14A to avoid uncertain or undesirable conditions at edge 14A.

Buoyancy device 92 is shown in FIG. 2E schematically without tethers but may be tethered if the installation so requires. Using this system, the weight of section 18B of pipeline 18 retains buoyancy device 92 in position. In this configuration, upper section 18A of pipeline 18 is optionally taut between flexure control device 94 and buoyancy device 92. Lower end 18B of pipeline 18 may either exist in a catenary-shaped position (as shown schematically) or may be taut through the addition of another anchor flexure control device 94 at bottom 16 of scarp 12.

Figure 2F:
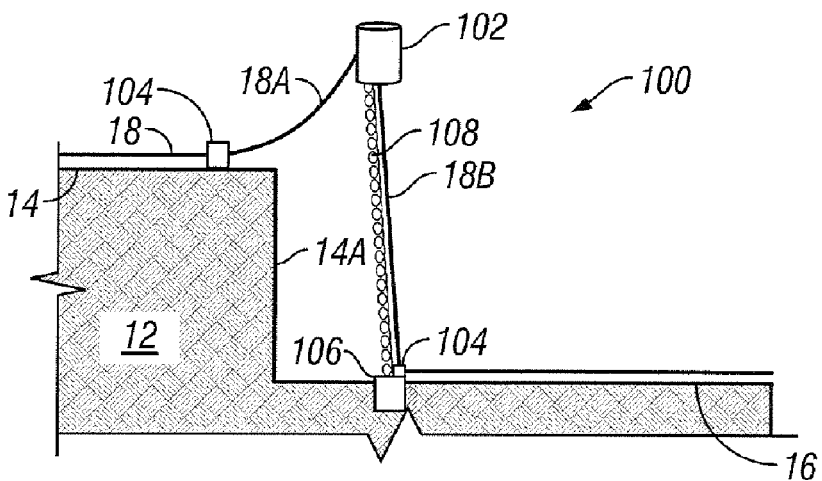

Referring now to FIG. 2F, a fourth alternative embodiment of a concentrated buoyancy system 100 is shown. Pipeline buoyancy system 100 enables a pipeline 18 to extend from a flexure control device 104 at the top 14 of a scarp 12 to the bottom 16 of scarp 12. Flexure control device 104 is shown set back from a cliff edge 14A of scarp 12 in order to avoid unknown or undesirable conditions at edge 14A. Buoyancy system 100 includes a buoyancy device 102 tethered to a piling 106 by a tether cable 108. Piling 106 may be constructed in any manner known to one skilled in the art, including, but not limited to, driven pilings, suction pilings, or other subsea anchors so long as a mounting fixed to the sea floor for buoyancy device 102 is provided.

In this embodiment, pipeline section 18A extends from a flexure control device 104 to buoyancy device 102 in a catenary-like configuration. Pipeline section 18B then extends from buoyancy device 102 down to scarp bottom 16 roughly parallel with tether cable 108. From scarp bottom 16, pipeline 18 is able to continue on the subsea floor to its next destination. Optionally, buoyancy device 102 may contain features that ease the transition from catenary section 18A to pipeline section 18B through an approximately 90 degree angle at buoyancy device 102. For example, pipeline sections 18A and 18B may rigidly terminate at buoyancy device 102 with a flexible, or rigid bent jumper (not shown) making the connection therebetween. Furthermore, buoyancy device 102 of FIG. 2F is shown as a cylindrical buoy, but other buoyancy device designs known by one skilled in the art may be employed.

Figure 2G:
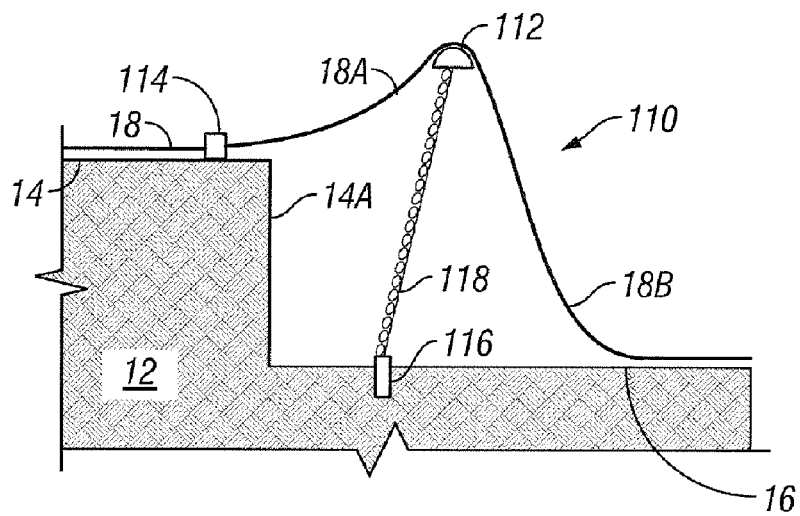

Referring now to FIG. 2G, a fifth alternative embodiment of a concentrated buoyancy pipeline system 110 is shown.

Pipeline system 110 includes a buoyancy device 112 tethered to piling 116 by tether cable 118. Buoyancy system 110 enables pipeline 18 to traverse from a flexure control device 114 at top 14 of scarp 12 to buoyancy device 112 and then to bottom 16 of scarp 12. Two suspended sections 18A and 18B of pipeline 18 are thus created, each of which is suspended in a catenary-like shape. Buoyancy device 112 is shown as a profiled buoy, one that allows pipeline 18 to curve easily and smoothly thereacross with minimal or no ovalization experienced by the cross-section of pipeline 18. Alternatively, buoyancy device 112 may be constructed as an H-shaped, rectangular, or otherwise contoured buoy, as would be appreciated by one of ordinary skill in the art. As with the system 100 of FIG. 2F detailed above, pipeline buoyancy system 110 of FIG. 2G employs a flexure control device 114 that is located away from cliff edge 14A of scarp. As mentioned above, this configuration (as well as all other embodiments shown in FIGS. 2E–2J) can be advantageous in circumstances where the composition or condition of the formation at or near the edge 14A is either unknown or not conducive to the placement of flexure control device 114 thereupon.

Figure 2H:
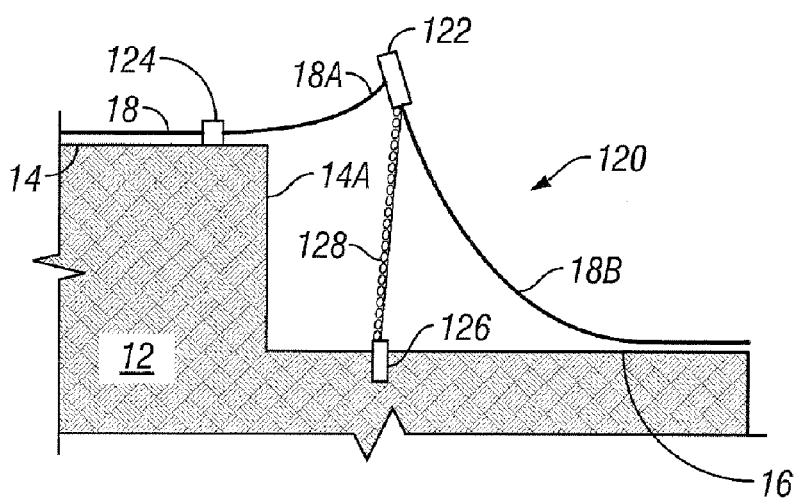

Referring now to FIG. 2H, a sixth alternative embodiment of a concentrated buoyancy pipeline system 120 is shown. Pipeline system 120 includes an integral buoyancy device 122 tethered to a piling 126 by a tether cable 128. Buoyancy system 120 allows pipeline 18 to traverse from flexure control device 124 at top 14 of scarp 12 to buoyancy device 122 and then to bottom 16 of scarp 12. As with the immediately preceding embodiments, flexure control device 124 is located away from cliff edge 14A of scarp 12 in order to avoid unknown or undesirable formation conditions at edge 14A. Buoyancy device 122, shown in this embodiment as an integrated buoy, is optionally integrated with bottom section 18B of pipeline 18. As a result, buoyancy device 122 is more rigidly connected to pipeline section 18B than to first section 18A, which is subsequently connected to buoyancy device 122 to complete the span. Pipeline sections 18A, 18B assume catenary-like geometries through their spans. Pipeline section 18B may assume a more gradual curve than span 18A due to buoyancy device 122 and pipeline section 18B being rigidly connected and towed out as a single unit.

Figure 2I:
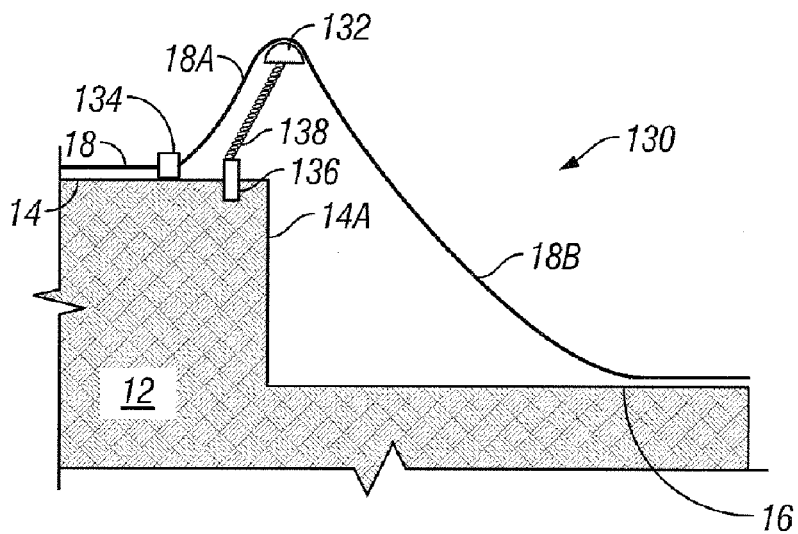

Referring now to FIG. 2I, a seventh alternative embodiment of a concentrated buoyancy pipeline system 130 is shown. Pipeline buoyancy system 130 is analogous to buoyancy system 110 of FIG. 2G with the exception that subsea piling 136 and tether 138 are located at the top 14 of scarp 12, rather than at the bottom 16. Nevertheless, buoyancy system 130 includes a profiled buoyancy device 132 tethered to subsea piling 136 by tether cable 138. Buoyancy system 130 allows pipeline 18 to traverse from flexure control device 134 at top 14 (but away from cliff edge 14A) of scarp to buoyancy device 132 and then to bottom 16 of scarp 12.

Figure 2J:
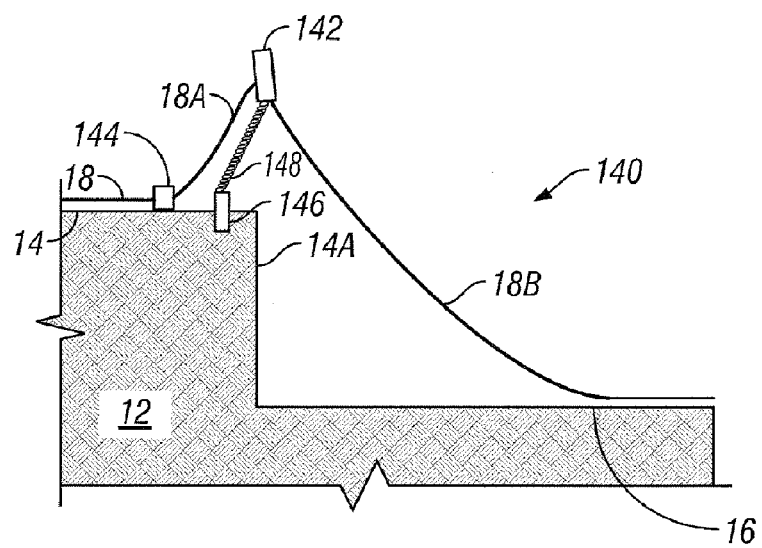

Referring now to FIG. 2J, an eighth alternative embodiment of a concentrated buoyancy system 140 is shown. Pipeline buoyancy system 140 is analogous to buoyancy system 120 of FIG. 2H with the exception that subsea piling 146 and tether 148 are located at the top 14 of scarp 12, rather than at the bottom 16. Nevertheless, buoyancy system 140 includes an integrated buoyancy device 142 tethered to subsea piling 146 by tether cable 148. Buoyancy system 140 allows pipeline 18 to traverse from flexure control device 144 at top 14 (but away from cliff edge 14A) of scarp to buoyancy device 142 and then to bottom 16 of scarp 12.

Referring again to FIGS. 2I–2J together, buoyancy systems 130, 140 are desirable for installations where the location and installation of anchor piling 136 and 146 is more feasible or cost effective at the top 14 of scarp 12 rather than at the bottom 16. For example, the change in depth between top 14 and bottom 16 of scarp may be so much that it is cost prohibitive to install pilings 136 and 146 at the extended depth at the bottom 16. Furthermore, because an operation to install flexure control devices 134 and 144 at top 14 of scarp 12 must already be performed, it may be desirable to also install pilings 136 and 146 in a proximate location. Finally, whereas the formation at top 14 of scarp 12 may be too loose or silty to properly retain flexure control devices 134 and 144, such formations may be optimally structured for the installation of a suction or driven pilings 136, 146, thereby making such installations beneficial.

Figure 3A:
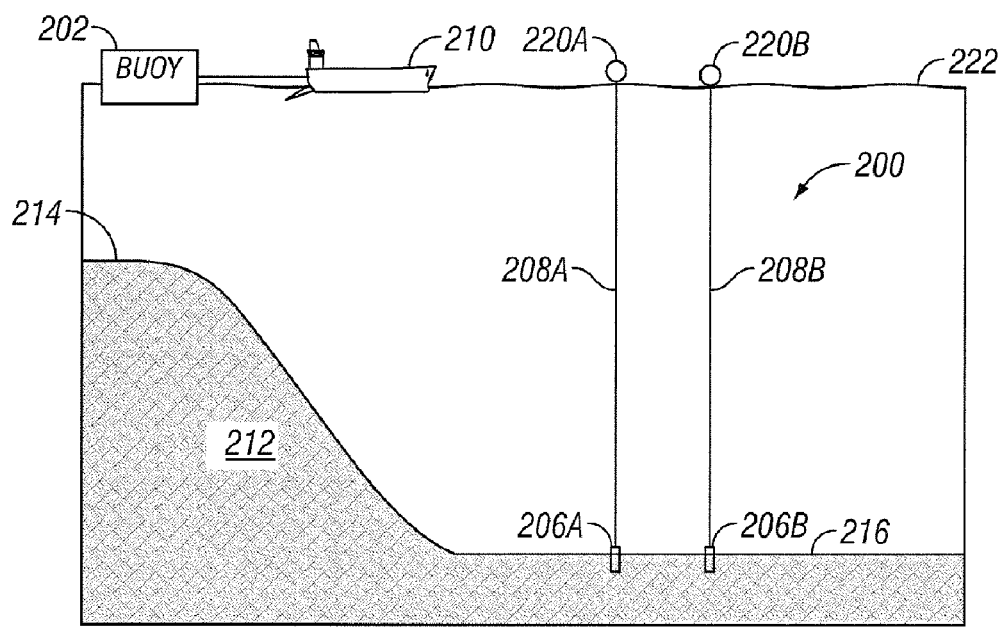
FIGS. 3A–3H are schematic representations of a method used to deploy a concentrated buoyancy pipeline in accordance with an embodiment of the present invention.

Referring now to FIGS. 3A–3H, a first embodiment of a method of deploying a concentrated buoyancy system 200 will be described. Referring initially to FIG. 3A, the installation of buoyancy system 200 begins with the installation of suction pilings 206A and 206B (more pilings can be used based on need) at the bottom 216 of an undersea scarp 212. Suction pilings 206A and 206B are installed using methods commonly known to those skilled in the art and are connected to small temporary buoyancy devices 220A and 220B (more buoyancy devices can be used based on need) at the ocean surface 222 by tethers 208A and 208B (more tethers can be used based on need). With buoyancy devices 220A and 220B, pilings 206A and 206B, and tethers 208A and 208B in place, a towing vessel 210 tows permanent buoyancy device 202 out to the location of scarp 212.

Figure 3B:
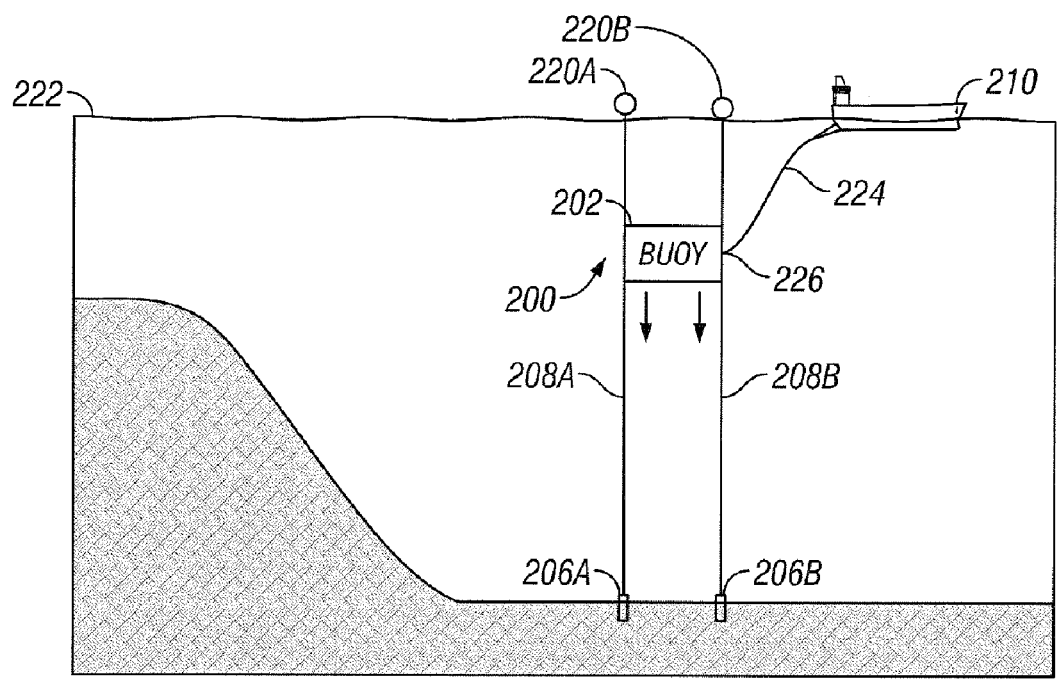

Referring now to FIG. 3B, buoyancy device 202 is attached to tethers 208A and 208B at ocean surface 222. Once attached, vessel 210 releases buoyancy device 202 but remains in communication with a subsea winch or jack 226 through a cable 224. Operators aboard vessel 210 then activate winch 226 to draw buoyancy device 202 into the ocean until it reaches the desired depth. Alternatively, buoyancy device 202 may be installed with less than its full buoyancy to make winching operation easier. Once buoyancy device 202 reaches desired depth, buoyancy device 202 can then be de-ballasted to attain full desired buoyancy.

Figure 3C:
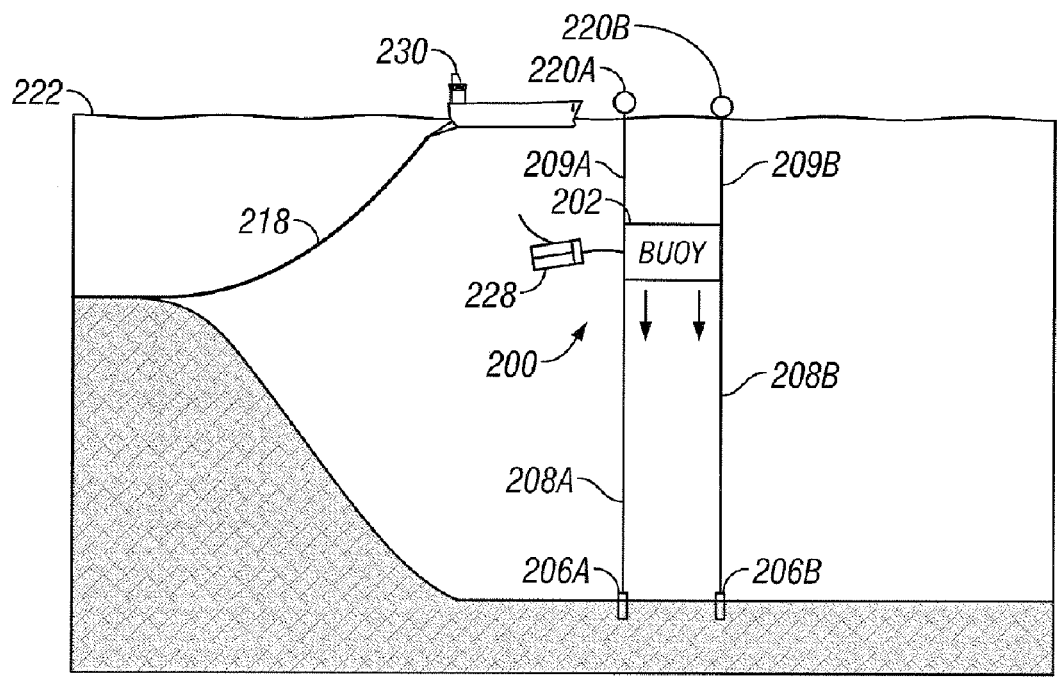

Referring now to FIG. 3C, a pipelay vessel 230 lays pipeline 218 as it approaches the location of buoyancy device 202. A sub sea remotely operated vehicle (ROV) 228 is used to jettison small temporary buoyancy devices 220A and 220B from permanent buoyancy device 202 and its mooring lines 209A and 209B.

Figure 3D:
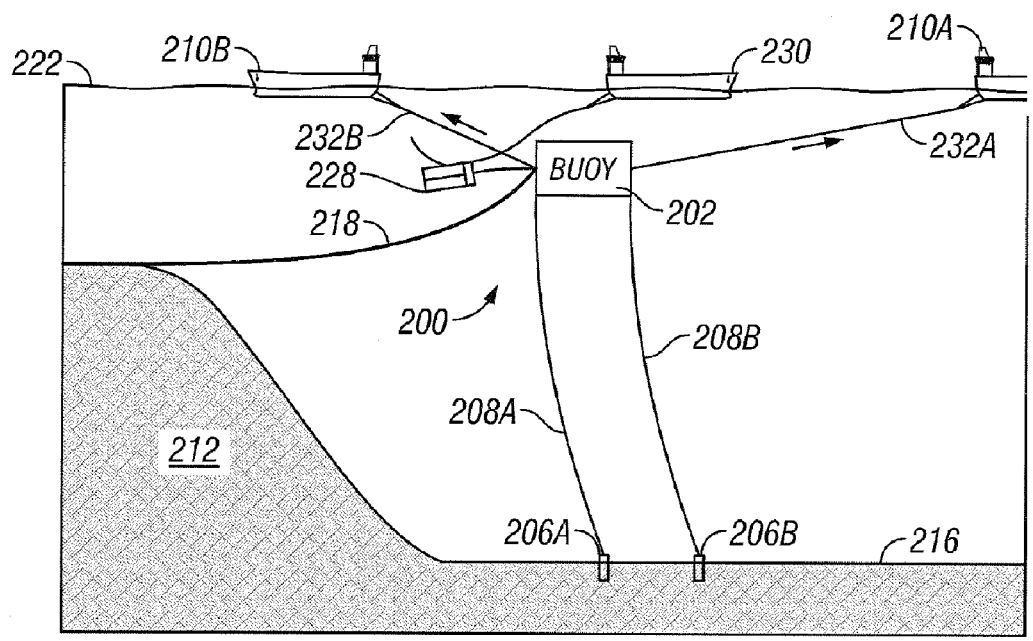

Referring now to FIG. 3D, ROV 228 is piloted to attach pipeline 218 from pipelay vessel 230 to buoyancy device 202. Towing vessels 210A and 210B connect to buoyancy device 202 with tension cables 232A and 232B to help prevent buoyancy device from moving while ROV 228 connects pipeline 218 to buoyancy device 202.

Figure 3E:
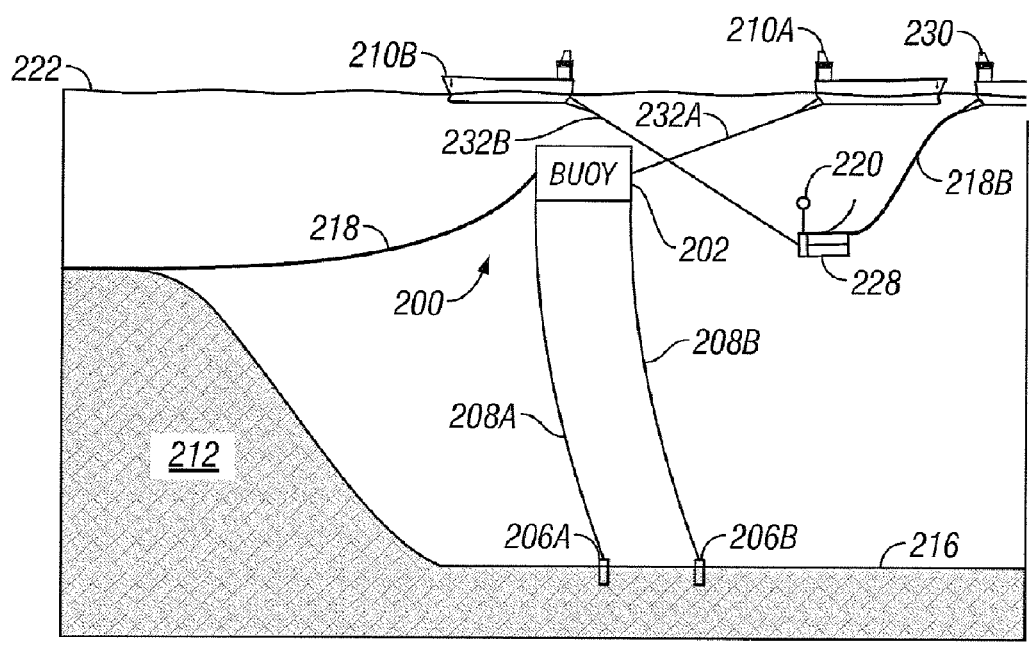

Referring now to FIG. 3E, pipelay vessel 230 begins laying second section of pipeline 218B while towing vessel 210A holds buoyancy device 202 with attached first section of pipeline 218 in place with tension cable 232A. Second towing vessel 210B can assist pipelay vessel 230 by securing tension cable 232B to the free end of second section of pipeline 218B while ROV 228 assists and pilots second section 218B to buoyancy device 202. A small temporary buoyancy device 220 can be attached to the end of second section 218B to assist ROV 228 while cable 232B winches section 218B to permanent buoyancy device 202

Figure 3F:
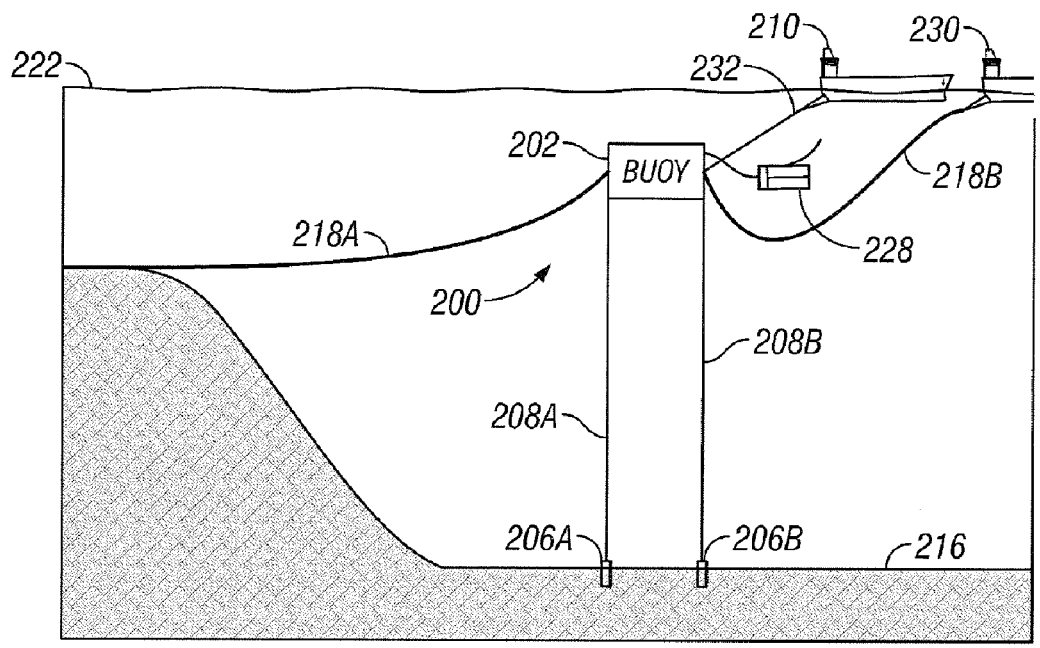
Figure 3G:
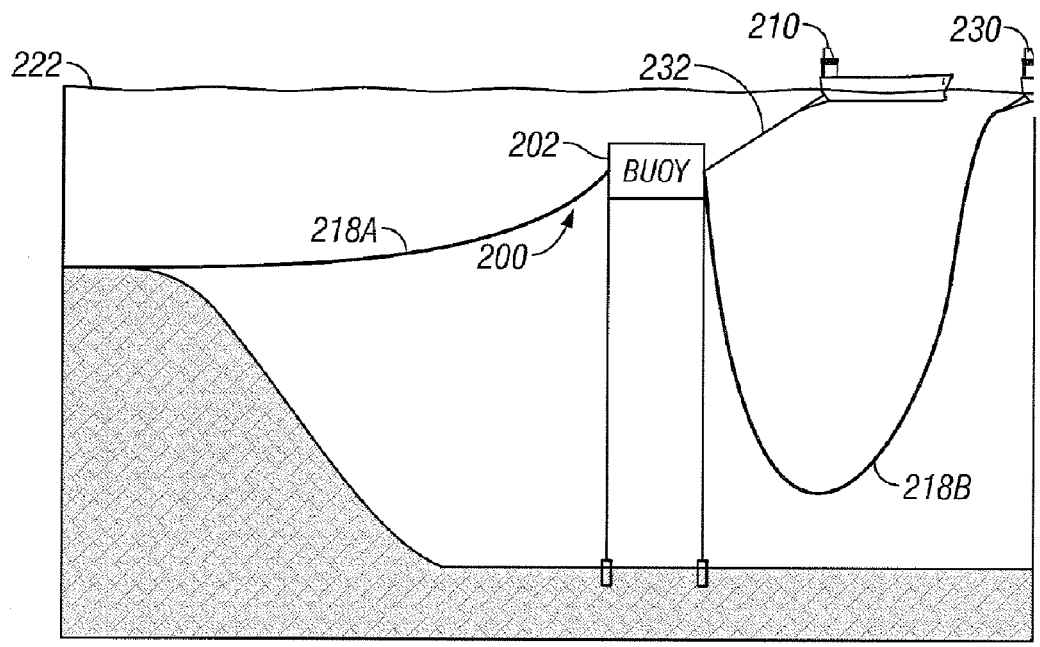

Referring to FIG. 3F, subsea ROV 228 secures free end of second pipeline section 218B to buoyancy device 202. Towing vessel 210 assists ROV 228 during this process by holding buoyancy device 202 in place with tension cable 232. After ROV 228 connects pipeline section 218B to buoyancy device, the ROV releases small temporary buoyancy device 220 for recovery at the surface 222. Referring to FIG. 3G, towing vessel 210 retains buoyancy device assembly 202 with tension cable 232 while pipelay vessel 230 continues laying second section 218B of the pipeline.

Figure 3H:
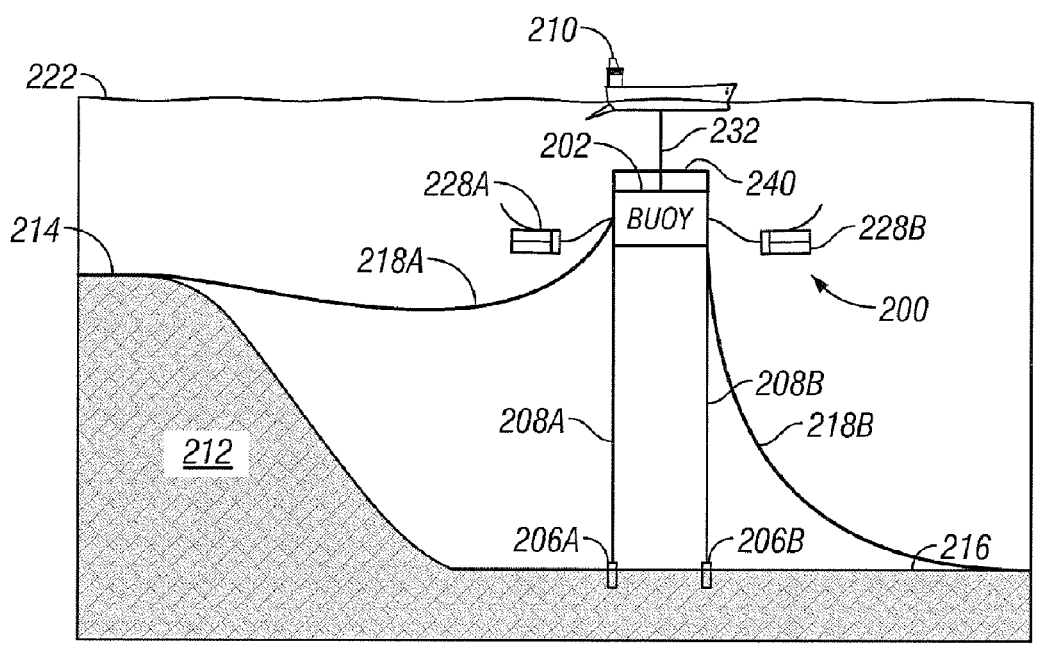

Referring finally to FIG. 3H, the pipeline is completed by connecting first section 218A with second section 218B by means of a jumper 240. Ideally, jumper section 240 is installed by a pair of ROVs 228A and 228B, but may be installed by divers, undersea cranes, or any other techniques known in the art. Optionally, towing vessel 210 secures buoyancy device 202 in place through an attached tension cable 232. This allows pilots of ROVs 228A and 228B to install the jumper with minimal movement of buoyancy device 202. Following the installation of jumper 240, the pipeline is ready for operation.

Figure 4A:
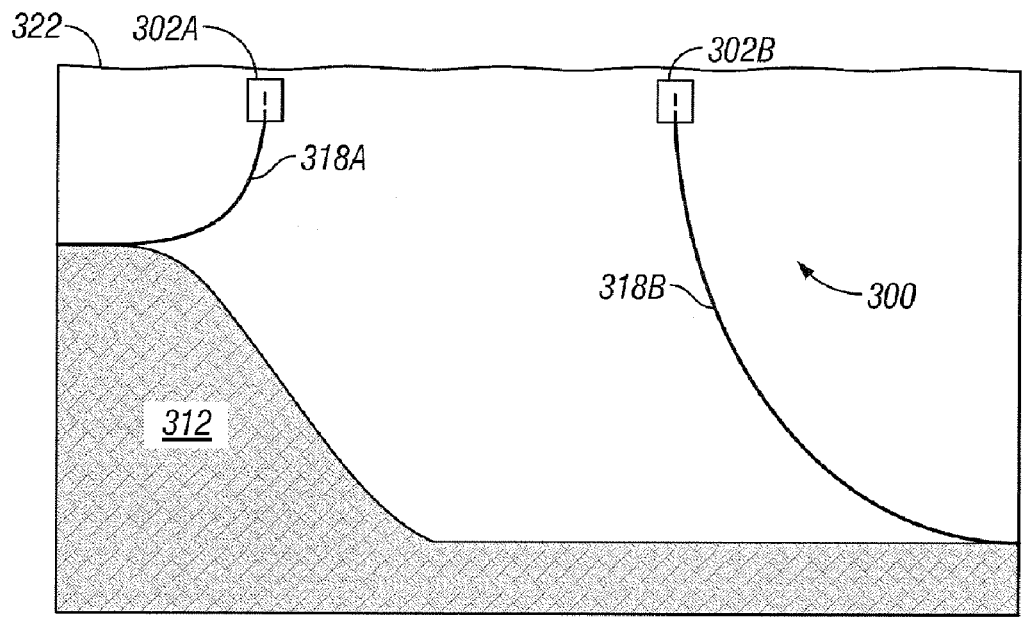
FIGS. 4A–4D are schematic representations a second method used to deploy a concentrated buoyancy pipeline in accordance with an embodiment of the present invention.

Referring generally to FIGS. 4A–4D, an alternative embodiment of a method of deploying a concentrated buoyancy pipeline system 300 to traverse an undersea scarp 312 will now be described. Referring initially to FIG. 4A, buoyancy system 300 is optionally installed by laying pipeline sections 318A, 318B with buoyancy devices 302A and 302B already attached thereto. Buoyancy devices 302A and 302B are constructed so that they may be filled and drained of fluid to alter their buoyancy characteristics. As shown in FIG. 4A, pipeline sections 318A and 318B with attached buoyancy devices 302A and 302B are optionally laid such that buoyancy devices 302A and 302B are close to the surface 322 and are proximate to one another. Pipeline sections 318A and 318B leading to and away from buoyancy devices 302A, 302B, respectfully, can be installed using methods already known to one skilled in the art.

Figure 4B:
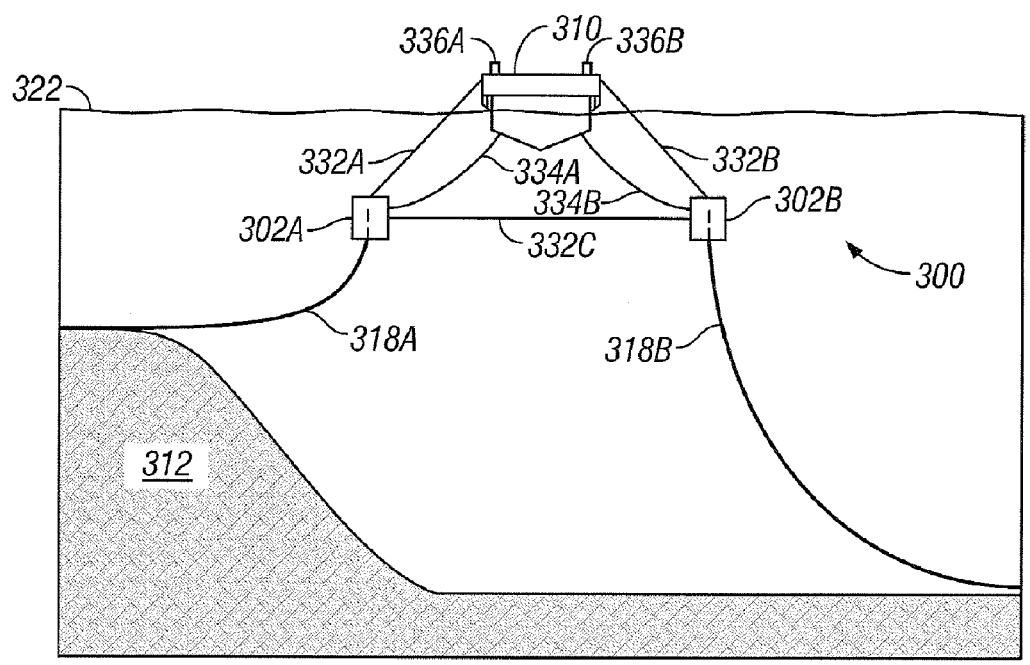

Referring now to FIG. 4B, a towing vessel 310 having two winches is moved into position over buoyancy devices 302A and 302B. A tension cable in three sections 332A, 332B, and 332C is strung from a first winch 336A, to buoyancy device 302A, then to buoyancy device 302B, and finally to second winch 336B. Fluid/air lines 334A and 334B are also connected to the fluid inlets (not shown) of buoyancy devices 302A and 302B, respectively. Using this arrangement, winches 336A and 336B aboard vessel 310 can be operated to pull buoyancy devices 302A and 302B together. Simultaneously, fluid/air is added to or released from buoyancy devices 302A and 302B through fluid lines 334A and 334B to adjust the buoyancy in buoyancy devices 302A and 302B as needed. If all steps are coordinated properly, the buoyancy devices 302A and 302B terminating pipeline sections 318A and 318B will come together at the desired depth below waterline 322.

Figure 4C:
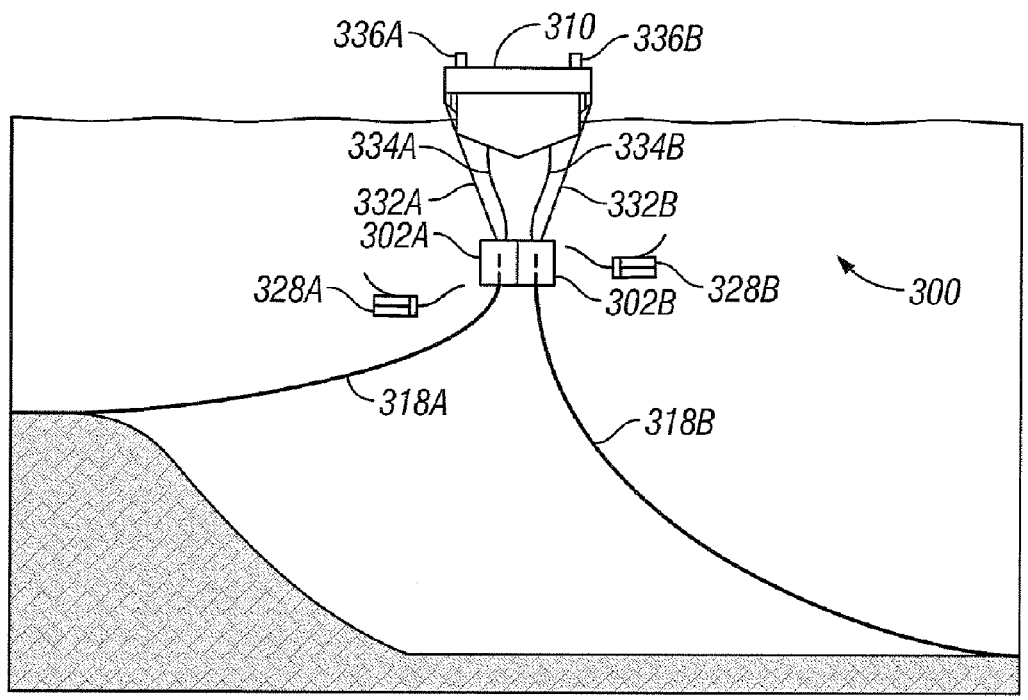

Referring now to FIG. 4C, buoyancy devices 302A and 302B are shown pulled together and at the proper water depth. Subsea ROVs 328A and 328B are then used to permanently secure the two buoyancy device halves 302A and 302B together so that they are inseparable and form buoyancy assembly 302.

Figure 4D:
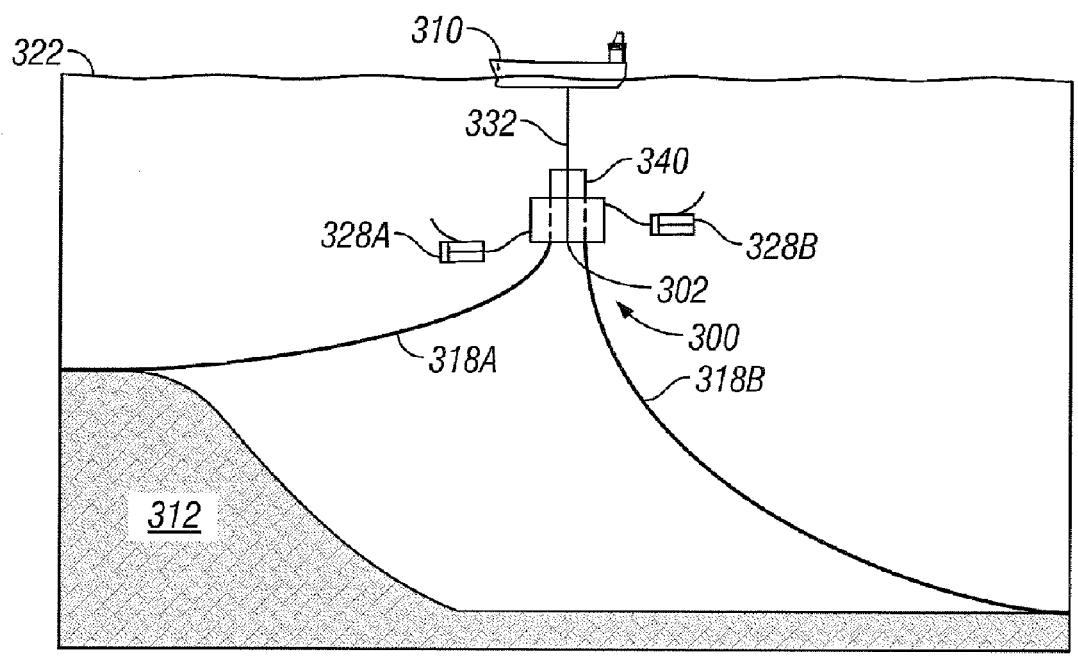

Referring next to FIG. 4D, subsea ROV's 328A and 328B attach a jumper section 340 across both halves of unified buoyancy device 302 to make the completion between pipeline sections 318A and 318B. Towing vessel 310 assists ROVs 328A and 328B by holding buoyancy device 302 and jumper in place with tension cable 332 from water surface 322. Once jumper connection 340 is made, the pipeline system 300 may now be used to flow petrochemicals therethrough.

Figure 5A:
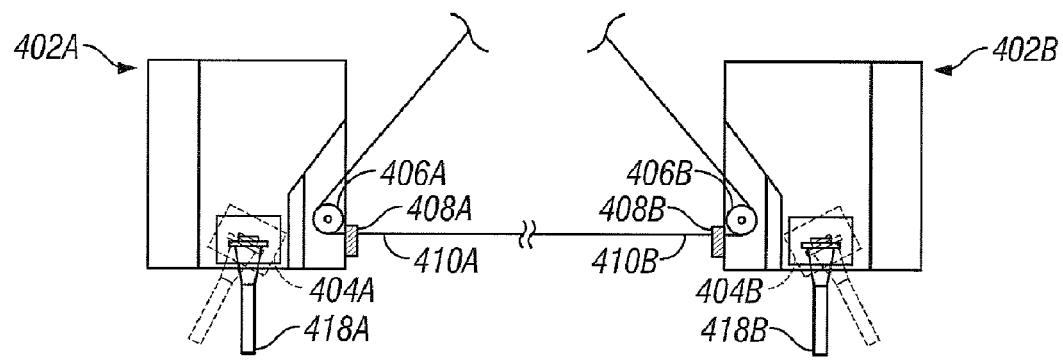
FIG. 5A is a side view schematic drawing of a buoyancy apparatus for use with the method described by FIGS. 4A–4D in accordance with an embodiment of the present invention.
Figure 5B:
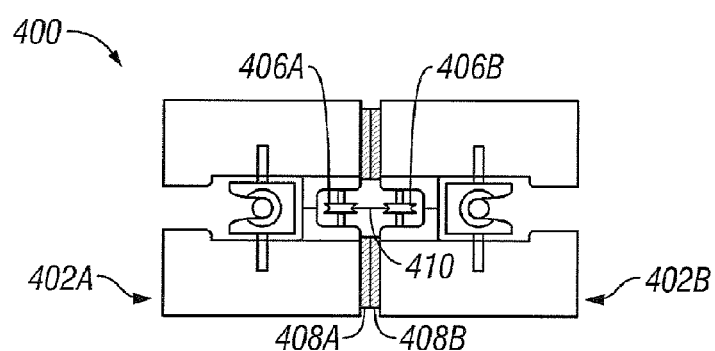
FIG. 5B is a top view schematic drawing of the apparatus of FIG. 5A whenever the halves 402A, 402B have been drawn together.

Referring now to FIGS. 5A and 5B, a buoyancy apparatus 400 capable of being deployed with pipeline system 300 is shown. Buoyancy apparatus 400 includes two buoyancy device halves, 402A and 402B, each having a respective hinged pipeline basket 404A and 404B, pulley system 406A and 406B, and latching mechanism 408A and 408B. Hinged pipeline baskets 404A and 404B retain and allow pipeline sections 418A and 418B to swivel as buoyancy devices 402A and 402B are manipulated. Pulleys 406A and 406B allow cables 410A and 410B run therethrough to move freely when tension is applied to them by winches for example, 336A and 336B of FIG. 4B on a vessel (for example, 310 of FIG. 4B) to pull buoyancy device halves 402A and 402B together as seen in FIG. 5A. Finally, latching mechanisms 408A and 408B allow buoyancy device halves 402A and 402B to be permanently held together after they are winched together by cables 410A and 410B as seen in FIG. 5B. Latching mechanisms 408A and 408B are of any configuration known to those skilled in the art, but are optionally constructed such that they may be activated by remotely operated vehicles (ROV's).

It should be understood by one of ordinary skill in the art that pipeline installations in accordance with the disclosed embodiments of the present invention are intended to be for permanent undersea pipeline installation. Other pipeline systems may exist to use buoyancy in the laying of subsea pipeline, but such systems are either temporary in nature or do not use concentrated buoyancy in their designs.

Numerous embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What is claimed is:

1. An apparatus to traverse a subsea topographic feature, comprising:
a subsea pipeline constructed to carry fluids from a first location across a topographic feature to a second location;
wherein the topographic feature is selected from the group consisting of subsea basins, domes, valleys, cliffs, canyons, escarpments and combinations thereof;
said pipeline including at least one concentrated buoyancy device characterized by positive buoyancy;
said pipeline divided into a first pipeline section extending from said first location on a subsea floor to said buoyancy device and a second pipeline section extending from said buoyancy device to said second location on a subsea floor; and
said buoyancy device providing a connection between said first and second pipeline sections allowing fluid communication from said first pipeline section to said second pipeline section across the topographic feature.

2. The apparatus of claim 1 wherein said concentrated buoyancy device is selected from the group consisting of cylindrical buoys, profiled buoys, H-shaped buoys, rectangular buoys, and integrated buoys.

3. The apparatus of claim 1 further including a mooring system to retain said concentrated buoyancy device in position, said mooring system including at least one subsea anchor piling and at least one mooring line securing said concentrated buoyancy device to each subsea anchor piling.

4. The apparatus of claim 3 wherein said mooring system is located proximate to said first location.

5. The apparatus of claim 3 wherein said mooring system is located proximate to said second location and said first pipeline section is unmoored at said first location.

6. The apparatus of claim 3 wherein said at least one subsea anchor piling is a suction piling.

7. The apparatus of claim 3 wherein said at least one subsea anchor piling is a driven piling.

8. The apparatus of claim 1 further including a flexure strain.

9. The apparatus of claim 8 wherein said flexure control device includes a flex joint.

10. The apparatus of claim 8 wherein said flexure control device includes a stress joint.

11. The apparatus of claim 8 wherein said flexure control device includes a swivel.

12. The apparatus of claim 8 wherein said flexure control device includes an anchor.

13. The apparatus of claim 8 further including a second flexure control device at said second location configured to reduce bending stress and strain.

14. The apparatus of claim 8 wherein the topographic feature includes a cliff edge at said first location.

15. The apparatus of claim 14 wherein said first pipeline section has a lowest point below said cliff edge at said first location.

16. The apparatus of claim 14 wherein said flexure control device is offset from said cliff edge at said first location.

17. The apparatus of claim 16 wherein said first pipeline section is above said cliff edge at said first location.

18. The apparatus of claim 17 further comprising a mooring system proximate to said first location.

19. The apparatus of claim 17 further comprising a mooring system proximate to said second location.

20. The apparatus of claim 19 further comprising a second flexure control device at said second location configured to reduce bending stress and strain.

21. The apparatus of claim 1 wherein said concentrated buoyancy device is installed separately from said first pipeline section and said second pipeline section.

22. The apparatus of claim 1 wherein said concentrated buoyancy device is installed together with said first pipeline section.

23. The apparatus of claim 1 wherein said concentrated buoyancy device is configured to be installed simultaneously with said second pipeline section.

24. A method for traversing a topographic feature selected from the group consisting of subsea basins, domes, valleys, cliffs, canyons, and escarpments with a subsea pipeline comprising:
installing the apparatus of claim 1; and
transporting fluids through the pipeline from the first location across the topographic feature to the second location.

25. A method for traversing an undersea topographic feature with a subsea pipeline, comprising:
selecting a location to place a concentrated buoyancy device;
installing a plurality of suction pilings on a sea floor at the selected location;
deploying the concentrated buoyancy device to the location and attaching the concentrated buoyancy device to the plurality of suction pilings with mooring tether lines;
lowering the concentrated buoyancy device to a desired depth at the desired location;
connecting a first section of the subsea pipeline to the concentrated buoyancy device;
connecting a second section of the subsea pipeline to the concentrated buoyancy device; and
connecting a jumper line between the first section and the second section of the subsea pipeline.

26. The method of claim 25 further including stabilizing the concentrated buoyancy device with a towing vessel while connecting the first section of pipeline, the second section of pipeline, the jumper line between the first section and the second section, or a combination thereof.

27. A method for traversing an undersea topographic feature with a subsea pipeline, the method comprising:
connecting a first buoyancy device to a first section of pipeline and a second buoyancy device to a second section of pipeline;
laying the first section of pipeline with attached first buoyancy device in a location substantially before the topographic feature;
laying the second section of pipeline with attached second buoyancy device in a location substantially after the topographic feature;
winching and securing the first and the second buoyancy devices together to form a unified buoyancy device; and
connecting a jumper line from the first section of pipeline to the second section of pipeline.

28. The method of claim 27 further comprising operating a remotely operated vehicle to assist in connecting the jumper line from the first section of pipeline to the second section of pipeline.

29. The method of claim 27 further including supplying fluid to the first and second buoyancy devices to lower them to a deeper location as they are winched together.

30. The method of claim 27 wherein the first section of pipeline is laid with the first buoyancy device positioned partly out of water.

31. The method of claim 27 wherein the second section of pipeline is laid with the second buoyancy device positioned partly out of water.

32. A buoyancy assembly useful to connect a first subsea pipeline section to a second pipeline section according to the method of claim 27, the buoyancy assembly comprising:
first and second buoyancy devices including a hinged basket to swivelably receive a subsea pipeline section;
a pulley mechanism receiving a tension cable; and
a latching mechanism to secure said buoyancy devices together opposite said pulley mechanisms.

* * * * *